(12) United States Patent
Iwata et al.

(10) Patent No.: US 6,172,698 B1
(45) Date of Patent: Jan. 9, 2001

(54) HEAT ACTIVATION METHOD FOR THERMOSENSITIVE ADHESIVE LABEL, AND HEAT ACTIVATION APPARATUS AND LABEL PRINTER FOR THE SAME

(75) Inventors: Toshinobu Iwata; Masanaka Nagamoto; Takanori Motosugi, all of Shizuoka (JP)

(73) Assignee: Ricoh Company, Ltd., Tokyo (JP)

( * ) Notice: Under 35 U.S.C. 154(b), the term of this patent shall be extended for 0 days.

(21) Appl. No.: 08/951,947

(22) Filed: Oct. 17, 1997

(30) Foreign Application Priority Data

Oct. 18, 1996 (JP) .................................... 8-275977
Jul. 15, 1997 (JP) .................................... 9-189848
Oct. 16, 1997 (JP) .................................... 9-283593

(51) Int. Cl.$^7$ ........................................ B41J 2/32
(52) U.S. Cl. ..................... 347/171; 156/351; 156/361; 156/378
(58) Field of Search ................... 347/171, 202, 347/200; 503/201; 156/351, 361, 378

(56) References Cited

U.S. PATENT DOCUMENTS

| | | | |
|---|---|---|---|
| 4,370,370 | * 1/1983 | Iwata et al. | 428/40 |
| 4,397,709 | * 8/1983 | Schwenzer | 156/351 |
| 4,468,274 | * 8/1984 | Adachi | 156/320 |
| 4,590,497 | * 5/1986 | Shibata et al. | 428/40 |
| 4,707,211 | * 11/1987 | Shibata | 156/354 |
| 4,777,079 | 10/1988 | Nagamoto et al. | 428/212 |
| 4,784,714 | * 11/1988 | Shibata | 156/354 |
| 5,053,267 | 10/1991 | Ide et al. | 428/195 |
| 5,110,389 | 5/1992 | Hiyoshi et al. | 156/234 |
| 5,248,543 | 9/1993 | Yamaguchi et al. | 428/195 |
| 5,444,475 | * 8/1995 | Mitani | 347/200 |
| 5,661,513 | * 8/1997 | Shirakawa et al. | 347/202 |
| 5,846,358 | * 12/1998 | Nagamoto et al. | 156/64 |

FOREIGN PATENT DOCUMENTS

| | | |
|---|---|---|
| 2259800 | 6/1973 | (DE) . |
| 9304848 | 6/1993 | (DE) . |
| WO9420284 | 9/1994 | (WO) . |

* cited by examiner

Primary Examiner—Huan Tran
(74) Attorney, Agent, or Firm—Cooper & Dunham LLP

(57) ABSTRACT

A heat activation method for activating a thermosensitive adhesive label having a support and a thermosensitive adhesive layer which is provided on the support and is not adhesive at room temperature, so as to make the thermosensitive adhesive layer adhesive with the application of heat thereto, includes the step of heating the thermosensitive adhesive layer so as to make the thermosensitive adhesive layer adhesive by energizing a heater which is in contact with the thermosensitive adhesive layer, the heater having a heat-application portion which is constructed in such a fashion that a resistor and a protective layer are successively overlaid on a ceramic substrate. A heat activation apparatus has the above-mentioned heater, and a label printer for the thermosensitive adhesive label has a label holder, a printing apparatus, a cutter and a heat activator.

19 Claims, 3 Drawing Sheets

HEAT ACTIVATION METHOD FOR THERMOSENSITIVE ADHESIVE LABEL, AND HEAT ACTIVATION APPARATUS AND LABEL PRINTER FOR THE SAME

BACKGROUND OF THE INVENTION

1. Field of the Invention

The present invention relates to a heat activation method for a thermosensitive adhesive label comprising a support, and a thermosensitive adhesive layer which is provided on the support without a liner (i.e., a disposable backing sheet) and is not adhesive at room temperature, but can be made adhesive with the application of heat thereto.

The present invention also relates to an apparatus for heat-activating the above-mentioned thermosensitive adhesive layer of the thermosensitive adhesive label and a label printer capable of printing images on the thermosensitive adhesive label and heat-activating the thermosensitive adhesive layer thereof.

2. Discussion of Background

Recently, a recording label, in particular, a thermosensitive recording label has been used in a wide variety of fields, for example, in the system of point of sales (POS). In most of the above-mentioned conventional thermosensitive recording labels, a pressure-sensitive adhesive layer is generally provided on the back side of a thermosensitive recording layer, so that the label is stored in such a fashion that a liner (i.e., disposable backing sheet) is attached to the pressure-sensitive adhesive layer.

Such a thermosensitive recording label is useful, but it has some shortcomings. For instance, the liner must be discarded after released from the adhesive layer. Therefore, consideration must be given to the problem of waste disposal from the ecological viewpoint. In addition, the manufacturing cost is increased because of not only the cost of the linear itself, but also expenses involved by the treatment of the liner.

To solve the above-mentioned problems, there are proposed recording labels without a liner. For instance, as disclosed in Japanese Laid-Open Utility Model Applications 59-43979 and 59-46265 and Japanese Laid-Open Patent Application 60-54842, it is proposed to employ an adhesive layer comprising a pressure-sensitive adhesive in microcapsule form, and to provide a releasing agent layer on the surface of the recording label, opposite to the pressure-sensitive adhesive layer side so that the recording label may be stored in the form of a roll. According to the above-mentioned conventional proposals, however, sufficient adhesion is not generated in the pressure-sensitive adhesive prepared in the form of micro-capsules, and printing cannot be carried out on the surface of the label when the releasing agent layer is provided thereon.

Furthermore, there is proposed a thermosensitive recording label comprising a thermosensitive adhesive layer without a liner, as disclosed in Japanese Laid-Open Patent Application 63-303387 and Japanese Utility Model Publication 5-11573. When a recording label comprises a thermosensitive adhesive layer, heat-activation treatment of the thermosensitive adhesive layer becomes necessary. With respect to the above-mentioned heat activation treatment, the following methods are conventionally proposed: the application of hot air or infrared rays to the thermosensitive adhesive layer (Japanese Utility Model Publication 5-11573), the use of an electrical heater or induction coil (Japanese Laid-Open Patent Application 5-127598), the application of microwave to the thermosensitive adhesive layer (Japanese Laid-Open Patent Application 6-8977), the application of xenon flash to the thermosensitive adhesive layer (Japanese Laid-Open Patent Application 7-121108), and the application of halogen lamp to the thermosensitive adhesive layer (Japanese Laid-Open Patent Application 7-164750). Those heat activation methods have the drawbacks that it is difficult to efficiently transmit the thermal energy to the thermosensitive adhesive layer of the label. Therefore, the energy cost is increased because the thermal energy cannot be efficiently utilized. Further, the heat activation apparatus is easily overheated in the course of heat activation. In light of the energy cost and safety, it is proposed to enclose the heater with a heat insulating material. In this case, however, the heat activation apparatus cannot be made compact.

On the other hand, there is also known a heat activation method of the thermosensitive adhesive layer by bringing the thermosensitive adhesive layer into contact with a heating medium or a heat-transmitting medium heated by the heating medium. For example, a heat-application belt heated by a heater is brought into contact with the thermosensitive adhesive layer in Japanese Laid-Open Patent Application 57-37534; and a heated drum and a heated roller serving as the heating media are respectively used in Japanese Laid-Open Patent Applications 60-45132 and 6-263128.

When the thermosensitive adhesive layer is heat-activated by directly bringing it into contact with the above-mentioned heating medium such as a heated drum or roller, and heat-transmitting medium such as a heat-application belt, it is necessary that those heating media be preheated to carry out the heat activation in a heated condition in the interest of speedy heat activation operation. This involves the problem of safety.

In addition, the heat-activated thermosensitive adhesive tends to adhere to the surface of the heating medium or heat-transmitting medium after the completion of the heat activation. Because of such adhesion of the thermosensitive adhesive layer to the heating medium, the recording label itself will unfavorably wind round the heating medium.

Furthermore, when the above-mentioned thermosensitive adhesive label further comprises a thermosensitive coloring layer, the heat resistance of the thermosensitive coloring layer must be improved because the thermosensitive coloring layer easily causes the color development by the application of thermal energy in the course of heat activation. The increase of the heat resistance of the thermosensitive coloring layer is disadvantageous from the viewpoint of thermal sensitivity of the coloring layer.

There is disclosed a heat activation method in Japanese Laid-Open Patent Application 7-258613. According to this method, a heating medium is brought into pressure contact with a support of a recording label to heat-activate a thermosensitive adhesive layer provided on the support. This method has the advantages that it is possible to prevent the thermosensitive adhesive layer from being transferred to the heating medium and the recording label from sticking to the heating medium. However, a lot of thermal energy is wasted, and the heat activation of the thermosensitive adhesive layer cannot be smoothly completed. Therefore, the operating efficiency is lowered when the recording label is attached to a label-receiving member after heat-activating the thermosensitive adhesive layer of the recording label.

SUMMARY OF THE INVENTION

Accordingly, a first object of the present invention is to provide a heat activation method of a thermosensitive adhesive label comprising a support and a thermosensitive adhesive layer which is provided on the support and is not adhesive at room temperature, which heat activation method can be easily and efficiently carried out by the application of a small amount of thermal energy, the safety with respect to the overheating of a heater during the heat activation process being sufficiently taken into consideration, and in addition, free from the problem of the deposition of the heat-activated thermosensitive adhesive on the heat-application portion of the heater.

A second object of the present invention is to provide an apparatus for heat-activating the above-mentioned thermosensitive adhesive label.

A third object of the present invention is to provide a label printer capable of printing images on a thermosensitive coloring layer of the above-mentioned thermosensitive adhesive label and heat-activating the thermosensitive adhesive layer thereof.

The first object of the present invention can be achieved by a heat activation method for activating a thermosensitive adhesive label comprising a support and a thermosensitive adhesive layer which is provided on the support and is not adhesive at room temperature, so as to make the thermosensitive adhesive layer adhesive with the application of heat thereto, comprising the step of heating the thermosensitive adhesive layer so as to make the thermosensitive adhesive layer adhesive by energizing a heater which is in contact with the thermosensitive adhesive layer, the heater comprising a heat-application portion which comprises a ceramic substrate, and a resistor and a protective layer which are successively overlaid on the ceramic substrate.

The second object of the present invention can be achieved by an apparatus for heat-activating a thermosensitive adhesive label comprising a support and a thermosensitive adhesive layer which is provided on the support and is not adhesive at room temperature, so as to make the thermosensitive adhesive layer adhesive with the application of heat thereto, comprising a heat activator for heating the thermosensitive adhesive layer of the thermosensitive adhesive label in contact with the thermosensitive adhesive layer so as to make the thermosensitive adhesive layer adhesive, the heat activator comprising a heat-application portion which comprises a ceramic substrate, and a resistor and a protective layer which are successively overlaid on the ceramic substrate.

The third object of the present invention can be achieved by a label printer which comprises a label holder for holding a thermosensitive adhesive label comprising a support, a thermosensitive adhesive layer which is provided on one side of the support and is not adhesive at room temperature, and a thermosensitive coloring layer provided on the other side of the support, opposite to the thermosensitive adhesive layer with respect to the support; a printing apparatus for printing an image on the thermosensitive coloring layer of the thermosensitive adhesive label; a cutter for cutting the thermosensitive adhesive label to a predetermined length; and a heat activator for heat-activating the thermosensitive adhesive layer of the thermosensitive adhesive label so as to make the thermosensitive adhesive layer adhesive in contact with the thermosensitive adhesive layer, the heat activator comprising a heat-application portion which comprises a ceramic substrate, and a resistor and a protective layer which are successively overlaid on the ceramic substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

According to the method of heat-activating the thermosensitive adhesive label of the present invention, the heat-application portion of a heater is in contact with the thermosensitive adhesive layer, so that the heat activation can be surely and efficiently carried out. In addition, the heat-application portion of the heater for use in the present invention is constructed in such a manner that a resistor is provided on a ceramic substrate and a protective layer is coated over the resistor. Such a heat-application portion can be energized, for example, in accordance with the pulse width. The heat-application portion of the heater is energized by the so-called on-demand system. Therefore, the thermosensitive adhesive layer can be heat-activated the moment the heat-application portion of the heater is energized. As a result, the heater may not always stand ready for the heat activation in a heated condition. Thus, the thermal energy required for heat activation can be reduced, and the thermosensitive adhesive label can be prevented from being overheated in the course of heat activation, thereby increasing the safety of the apparatus for heat-activating the thermosensitive adhesive label. Further, the thermal energy generated by the heat-application portion of the heater can be efficiently transmitted to the thermosensitive adhesive layer, so that it is possible to heat-activate the thermosensitive adhesive layer even though the thermosensitive adhesive label is transported at high speed, and it is possible to prevent the heat-activated thermosensitive adhesive layer from transferring to the heat-application portion of the heater. Because of such improved heat activation process, the operation for attaching the heat-activated thermosensitive adhesive label to a label-receiving member can be carried out with high operating efficiency.

In order to further improve the heat activation efficiency, the heater may be previously heated to a temperature which is considered to be safe, preferably 40° C. or less.

It is preferable to employ a thermal head or a thin-film heater as the heater in the present invention. The thermal head or thin-film heater is easy to control the heating conditions, so that the heat activating conditions can be made constant. In addition, heat activation can be partially carried out when necessary by use of the thermal head or thin-film heater.

Figure 11:
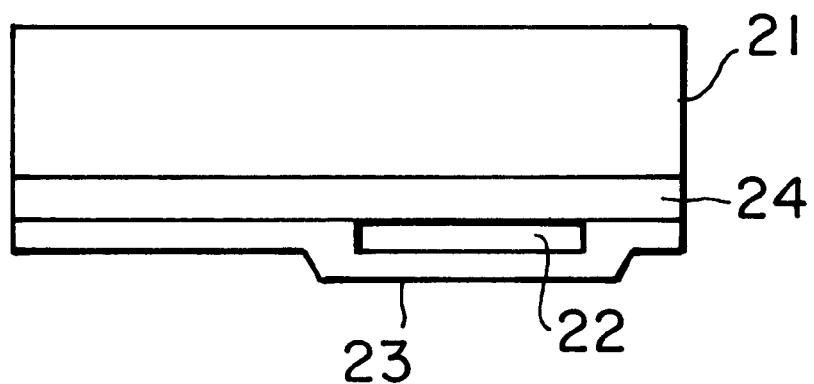
FIG. 11 is a schematic cross-sectional view which shows a thin-film heater used as the heat activator in the present invention.

FIG. 11 is a schematic cross-sectional view which shows a thin-film heater used as the heater in the present invention.

A thin-film heater as shown in FIG. 11 is constructed in such a manner that a thick-film heating resistor 22 in the form of a stripe is provided on a ceramic substrate 21, and a protective glass layer 23 is provided over the resistor 22 to protect the resistor 22 from wear and oxidation. In order to improve the thermal response, a heat-insulating glazed layer 24 may be further provided between the ceramic substrate 21 and the resistor 22.

As previously mentioned, the thermosensitive adhesive label for use in the present invention may further comprise a thermosensitive coloring layer which is provided on the support, opposite to the thermosensitive adhesive layer with respect to the support. According to the heat activation method of the present invention, the heating time for activating the thermosensitive adhesive layer can be controlled to be very short, so that the thermal energy applied to the thermosensitive adhesive layer is not transmitted to the thermosensitive coloring layer, and therefore, the color development of the thermosensitive coloring layer can be prevented in the course of the heat activation.

In the case where the thermosensitive coloring layer is provided on the support, opposite to the thermosensitive adhesive layer side, it is preferable that a heat insulating layer be provided between the support and the thermosensitive coloring layer and/or between the support and the thermosensitive adhesive layer. During the heat activation of the thermosensitive adhesive layer, heat conduction to the thermosensitive coloring layer can be interrupted by such a heat insulating layer, so that the color development of the thermosensitive coloring layer can be efficiently prevented. In addition, the thermal energy applied to the thermosensitive adhesive layer can be efficiently utilized for the heat activation thereof.

Furthermore, it is preferable that the heat insulating layer be a non-expandable heat insulating layer comprising minute void particles with a voidage of 30% or more, each comprising a thermoplastic resin for forming a shell.

In light of the previously mentioned advantages of the heat activation method of the present invention, there is also provided an apparatus for heat-activating a thermosensitive adhesive label comprising a support and a thermosensitive adhesive layer which is provided on the support and is not adhesive at room temperature, so as to make the thermosensitive adhesive layer adhesive with the application of heat thereto. The heat activation apparatus according to the present invention comprises a heat activator for heating the thermosensitive adhesive layer of the thermosensitive adhesive label in contact with the thermosensitive adhesive layer so as to make the thermosensitive adhesive layer adhesive, the heat activator comprising a heat-application portion which comprises a ceramic substrate, and a resistor and a protective layer which are successively overlaid on the ceramic substrate.

As the heat activator for use in the above-mentioned apparatus, a thermal head or a thin-film heater may be employed as previously mentioned.

It is preferable to dispose a pressure-application member in such a configuration that it is opposite to the heat-application portion of the heat activator in order to urge the thermosensitive adhesive label toward the heat-application portion of the heat activator. By the provision of the pressure-application member, the thermal energy can be still more efficiently transmitted to the thermosensitive adhesive label, thereby promoting the heat activation of the thermosensitive adhesive layer.

When the thermal head is used for the heat activator in the heat activation apparatus, it is preferable to use an edge-type thermal head. The reason for this is as follows: the thermosensitive adhesive layer is heat-activated when the heat-application portion of the thermal head is energized. Therefore, after passing over the heat-application portion of the thermal head, the heat-activated thermosensitive adhesive unfavorably tends to adhere to the surface of the thermal head.

Figure 6:
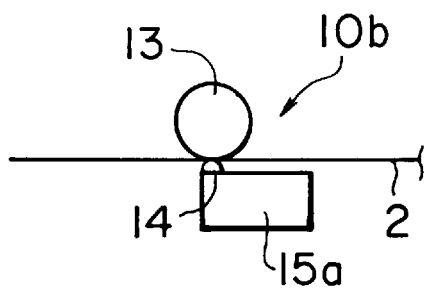
Figure 7:
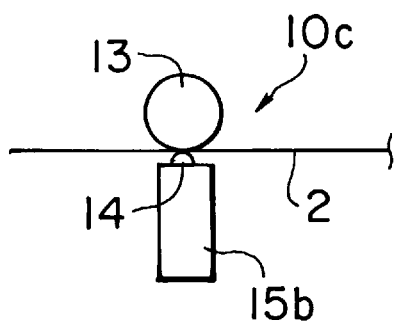
Figure 8:
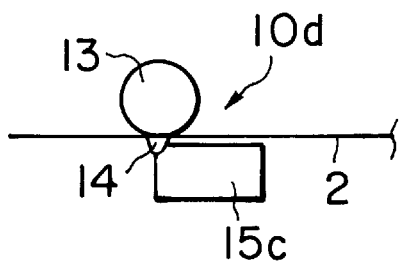

For instance, by employing an edge-type thermal head 15b as shown in FIG. 7, or a thermal head 15a or 15c as shown in FIG. 6 or 8, which is provided with a heat-application portion 14 at a position close to the corner of the thermal head, the above-mentioned problem can be solved. To be more specific, the contact of the heat-activated thermosensitive adhesive layer with the thermal head can be minimized, so that the heat-activated thermosensitive adhesive can be prevented from transferring to the thermal head.

Figure 9:
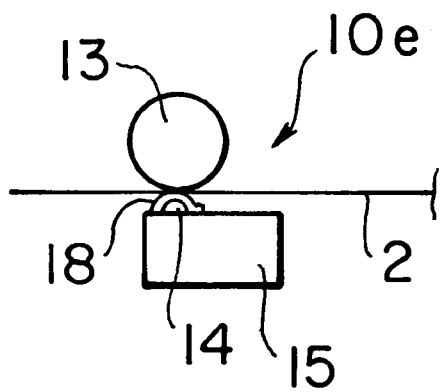

Alternatively, as shown in FIG. 9, it is preferable that a release layer 18 be provided on the surface of a heat-application portion 14 of the thermal head 15. This can also prevent the heat-activated thermosensitive adhesive 2 from attaching to the surface of the thermal head 15.

According to the present invention there is provided a label printer which comprises a label holder for holding a thermosensitive adhesive label comprising a support, a thermosensitive adhesive layer which is provided on one side of the support and is not adhesive at room temperature, and a thermosensitive coloring layer provided on the other side of the support, opposite to the thermosensitive adhesive layer with respect to the support; a printing apparatus for printing an image on the thermosensitive coloring layer of the thermosensitive adhesive label; a cutter for cutting the thermosensitive adhesive label to a predetermined length; and a heat activator for heat-activating the thermosensitive adhesive layer of the thermosensitive adhesive label so as to make the thermosensitive adhesive layer adhesive in contact with the thermosensitive adhesive layer, the heat activator comprising a heat-application portion which comprises a ceramic substrate, and a resistor and a protective layer which are successively overlaid on the ceramic substrate.

In this label printer, the above-mentioned printing apparatus and cutter may be arranged in any order.

By using the above-mentioned label printer, image printing can be carried out on the thermosensitive adhesive label, and the label can be cut to a predetermined length, and then the thermosensitive adhesive layer of the label can be heat-activated very smoothly. The thus obtained label carrying the image thereon can be attached to a label-receiving member very easily.

Figure 1:
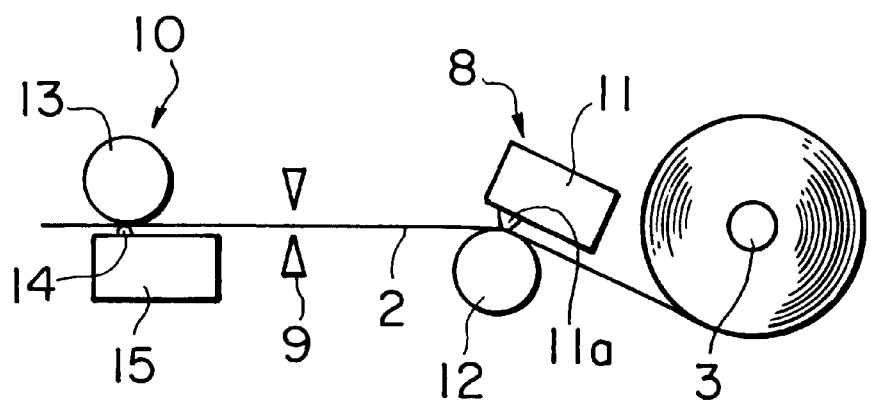
FIG. 1 is a schematic view which shows a structure of a label printer according to the present invention which is used for a thermosensitive adhesive label comprising a support, a thermosensitive coloring layer provided on one side of the support, and a thermosensitive adhesive layer provided on the other side of the support.
Figure 2:
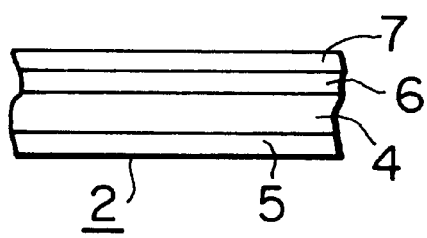
FIG. 2 is a schematic cross-sectional view of one example of a thermosensitive adhesive label for use in the present invention.

FIG. 1 is a schematic view which shows one example of the above-mentioned label printer according to the present invention, which is used for a thermosensitive adhesive label, for example, as shown in FIG. 2.

A thermosensitive adhesive label as shown in FIG. 2 comprises a support 4, for instance, a sheet of high quality paper, a thermosensitive adhesive layer 5 on the back side of the support 4, and a heat insulating layer 6 and a thermosensitive coloring layer 7 which are successively overlaid on the front side of the support 4, opposite to the thermosensitive adhesive layer 5 with respect to the support 4.

As shown in FIG. 1, a thermosensitive adhesive label 2 is held in the form of a roll by a label-holder 3. The thermosensitive adhesive label 2 is caused to pass through a printing apparatus 8 for printing images on the thermosensitive coloring layer 7 of the thermosensitive adhesive label 2 by the application of heat thereto; a cutter 9 for cutting the thermosensitive adhesive label 2 to a predetermined length; and a heat activator 10 for heat-activating the thermosensitive adhesive layer 5 of the thermosensitive adhesive label 2.

The printing apparatus 8 comprises a thermal head 11 for printing image on the thermosensitive coloring layer 7 of the label 2 by the application of heat thereto and a platen roller 12 for holding and transporting the thermosensitive adhesive label 2.

The heat activator 10 comprises a platen roll 13 for transporting the thermosensitive adhesive label 2 and a thin-film thermal head 15 which is provided with a heat-application portion 14. The platen roll 13 also serves as a pressure-application member for urging the thermosensitive adhesive label 2 toward the heat-application portion 14 of the thermal head 15.

The thin-film thermal head 15 can be energized, for example, in accordance with the pulse width by the on-demand system.

The thermosensitive adhesive label, of which thermosensitive adhesive layer can be made adhesive by the heat activation method of the present invention, is used not only as the above-mentioned thermosensitive recording adhesive label comprising a thermosensitive coloring layer, but also as a printing label comprising a colored printing layer, an image-receiving adhesive label for thermal image transfer ink ribbon, an image-receiving adhesive label for ink-jet image printing, an image-receiving adhesive label for sublimation type thermal image transfer ink ribbon, and an adhesive label for electrostatic recording.

Other features of this invention will become apparent in the course of the following description of exemplary embodiments, which are given for illustration of the invention and are not intended to be limiting thereof.

EXAMPLE 1
[Preparation of Thermosensitive Adhesive Label]
(Formation of heat insulating layer)

The following components were ground and dispersed in a ball mill until the average particle size reached 2.0 μm or less, so that a coating liquid for a heat insulating layer was prepared:

| | Parts by Weight |
|---|---|
| Aqueous dispersion of minute void particles (copolymer resin comprising vinylidene chloride and acrylonitrile as the main components) (solid content: 32 wt. %, average particle diameter: 5 μm, and voidage: 92%) | 30 |
| Styrene - butadiene copolymer latex (solid content: 47.5 wt. %) | 5 |
| Water | 65 |

The thus prepared heat insulating layer coating liquid was coated on a sheet of high quality paper serving as a support, and dried in such a fashion that the deposition amount of the coating liquid was 5 g/m² on a dry basis. Thus, a non-expandable heat insulating layer was provided on the support.

(Formation of thermosensitive coloring layer)

A mixture of the following components was separately dispersed and pulverized in a ball mill until the average particle size reached 2.0 μm or less, thereby obtaining a Liquid A and a Liquid B:

| | Parts by Weight |
|---|---|
| [Liquid A] | |
| 3-dibenzylamino-6-methyl-7-anilinofluoran | 20 |
| 10% aqueous solution of polyvinyl alcohol | 20 |
| Water | 60 |
| [Liquid B] | |
| 4-hydroxy-4'-isopropoxy-diphenylsulfone | 10 |
| 10% aqueous solution of polyvinyl alcohol | 25 |
| Calcium carbonate | 15 |
| Water | 50 |

One part by weigh of the Liquid A and eight parts by weight of the Liquid B were mixed and stirred, so that a thermosensitive coloring layer coating liquid was prepared.

On the above obtained heat insulating layer, the thermosensitive coloring layer coating liquid was coated and dried in such a fashion that the deposition amount of the coating liquid was 5 g/m² on a dry basis. Then, the surface of the coated layer was subjected to super-calendering to have a surface smoothness of 600 to 700 sec in terms of Bekk's smoothness, so that a thermosensitive coloring layer was provided on the heat insulating layer.

(Formation of thermosensitive adhesive layer)

On the back side of the support, opposite to the side of the thermosensitive coloring layer with respect to the support, a commercially available thermosensitive adhesive "DT-200" (Trademark), made by Regitex Co., Ltd., with a solid content of 58 wt. % was coated and dried in such a fashion that the deposition amount of the adhesive was 25 g/m² on a dry basis, so that a thermosensitive adhesive layer was provided on the support.

Thus, a thermosensitive adhesive label No. 1 for use in the present invention was obtained.

The thus obtained thermosensitive adhesive label No. 1 was set to the label-holder 3 of the label printer as shown in FIG. 1. With pulling the thermosensitive adhesive label No. 1 out of the label-holder 3, the thermosensitive coloring layer 7 of the label No. 1 was subjected to thermal printing by the application of heat thereto from a heat-application portion 11a of the thermal head 11.

After the completion of thermal printing, the thermosensitive adhesive label No. 1 was cut to a predetermined length by the cutter 9 and sent to the heat activator 10. The thermosensitive adhesive layer 5 of the label 2 was heated in contact with the heat-application portion 14 of the thin-film thermal head 15, thereby heat-activating the thermosensitive adhesive layer 5 of the label 2.

Since the heat-application portion 14 was in contact with the thermosensitive adhesive layer 5, the thermosensitive adhesive layer 5 was surely heat-activated by energizing the heat-application portion 14 of the thermal head 15. Therefore, the thermal energy required for heat-activation was minimized, and it was possible to prevent the thermosensitive adhesive label from being overheated, thereby increasing the safety of the label printer.

Further, since the thermal energy was efficiently transmitted from the heat-application portion 14 of the thermal head 15 to the thermosensitive adhesive layer 5, the heat activation was achieved even though the thermosensitive adhesive label No. 1 was transported at high speed. Therefore, the heat-activated thermosensitive adhesive layer was not attached to the surface of the heat-application portion 14.

Due to smooth heat-activating operation of the thermosensitive adhesive layer, the operation for attaching the heat-activated thermosensitive adhesive label to a label-receiving member was carried out very efficiently.

Furthermore, because of the provision of the heat insulating layer 6 between the support 4 and the thermosensitive coloring layer 7 in the thermosensitive adhesive label No. 1, the thermal energy applied to the thermosensitive adhesive layer 5 was interrupted by the heat insulating layer 6 in the course of heat activation. As a result, it was possible to make the best use of the applied thermal energy for the heat activation, and to prevent the color development of the thermosensitive coloring layer 7 from taking place in the course of the heat activation.

EXAMPLE 2

The procedure for preparation of the thermosensitive adhesive label No. 1 in Example 1 was repeated except that the aqueous dispersion of the minute void particles for use in the coating liquid for the heat insulating layer in Example 1 was replaced by a urea-formaldehyde resin with a solid content of 25 wt. %. Thus, a thermosensitive adhesive label No. 2 for use in the present invention was obtained.

The thus obtained thermosensitive adhesive label No. 2 was subjected to thermal printing of the thermosensitive coloring layer and heat-activation of the thermosensitive adhesive layer using the same label printer (shown in FIG. 1) as employed in Example 1.

EXAMPLE 3

Figure 3:
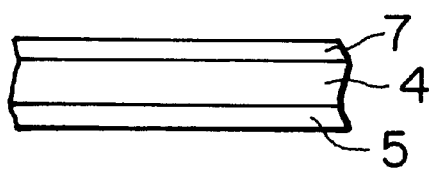
FIG. 3 is a schematic cross-sectional view of another example of a thermosensitive adhesive label for use in the present invention.

The procedure for preparation of the thermosensitive adhesive label No. 1 in Example 1 was repeated except that the heat insulating layer provided on the high quality paper in Example 1 was omitted. Thus, a thermosensitive adhesive label No. 3 was prepared as shown in FIG. 3.

The thus prepared thermosensitive adhesive label No. 3 was subjected to thermal printing of the thermosensitive coloring layer and heat-activation of the thermosensitive adhesive layer using the same label printer (shown in FIG. 1) as employed in Example 1.

EXAMPLE 4

The procedure for preparation of the thermosensitive adhesive label No. 1 in Example 1 was repeated except that a protective layer coating liquid with the following formulation was coated on the thermosensitive coloring layer and dried in such a fashion that the deposition amount of the coating liquid was 4 g/m$^2$ on a dry basis:
[Formulation for protective layer coating liquid]

|  | Parts by Weight |
| --- | --- |
| Silica | 10 |
| 10% aqueous solution of polyvinyl alcohol | 50 |
| Water | 40 |

Figure 4:
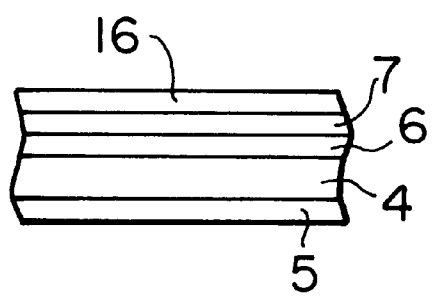
FIG. 4 is a schematic cross-sectional view of a further example of a thermosensitive adhesive label for use in the present invention.

Thus, a thermosensitive adhesive label No. 4 was prepared as shown in FIG. 4. In FIG. 4, reference numeral 16 indicates a protective layer.

The thus obtained thermosensitive adhesive label No. 4 was subjected to thermal printing of the thermosensitive coloring layer and heat-activation of the thermosensitive adhesive layer using the same label printer (shown in FIG. 1) as employed in Example 1.

EXAMPLE 5

Figure 5:
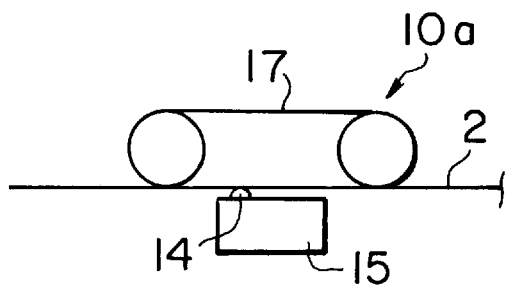
FIGS. 5 to 10 are schematic views, each of which shows an example of a heat activator for use in a label printer for the thermosensitive adhesive label according to the present invention.

The thermosensitive adhesive label No. 1 prepared in Example 1 was subjected to thermal printing of the thermosensitive coloring layer and heat-activation of the thermosensitive adhesive layer using a label printer equipped with a heat activator 10a as shown in FIG. 5.

To be more specific, the label printer as shown in FIG. 1 was modified in such a manner that the platen roll 13 employed in the heat activator 10 in FIG. 1 was replaced by a pressure-application belt 17 as shown in FIG. 5.

As a result, the transporting performance of the thermosensitive adhesive label was improved by using the pressure-application belt 17.

EXAMPLE 6

The thermosensitive adhesive label No. 1 prepared in Example 1 was subjected to thermal printing of the thermosensitive coloring layer and heat-activation of the thermosensitive adhesive layer in the same manner as in Example 1, except that the label printer used in Example 1 was modified in such a manner that the thin-film thermal head 15 for use in the heat activator 10 in FIG. 1 was replaced by a thick-film thermal head.

EXAMPLE 7

The thermosensitive adhesive label No. 1 prepared in Example 1 was subjected to thermal printing of the thermosensitive coloring layer and heat-activation of the thermosensitive adhesive layer using a label printer equipped with a heat activator 10b as shown in FIG. 6.

To be more specific, the label printer as shown in FIG. 1 was modified in such a manner that the thermal head 15 employed in the heat activator 10 in FIG. 1 was replaced by a thermal head 15a provided with a heat-application portion 14 at a position near the edge of the thermal head 15a, which is called a near-edge type thermal head.

As a result, the contact of the heat-activated thermosensitive adhesive layer with the surface of the thermal head 15a can be minimized, so that the thermosensitive adhesive layer was prevented from transferring to the surface of the thermal head 15a. Therefore, the thermosensitive adhesive label did not get wound around the thermal head 15a.

EXAMPLE 8

The thermosensitive adhesive label No. 1 prepared in Example 1 was subjected to thermal printing of the thermosensitive coloring layer and heat-activation of the thermosensitive adhesive layer using a label printer equipped with a heat activator 10c as shown in FIG. 7.

To be more specific, the label printer as shown in FIG. 1 was modified in such a manner that the thermal head 15 employed in the heat activator 10 in FIG. 1 was replaced by an edge-type thermal head 15b.

As a result, the contact of the heat-activated thermosensitive adhesive layer with the edge-type thermal head 15b can be minimized, so that the thermosensitive adhesive layer was prevented from transferring to the surface of the thermal head 15b. Therefore, the thermosensitive adhesive label did not get wound around the thermal head 15b.

EXAMPLE 9

The thermosensitive adhesive label No. 1 prepared in Example 1 was subjected to thermal printing of the thermosensitive coloring layer and heat-activation of the thermosensitive adhesive layer using a label printer equipped with a heat activator 10d as shown in FIG. 8.

To be more specific, the label printer as shown in FIG. 1 was modified in such a manner that the thermal head 15 employed in the heat activator 10 in FIG. 1 was replaced by a thermal head 15c provided with a heat-application portion 14 at the corner thereof, which is called a corner-edge type thermal head.

As a result, the contact of the heat-activated thermosensitive adhesive layer with the surface of the corner-edge type thermal head 15c can be minimized, so that the thermosensitive adhesive layer was prevented from transferring to the surface of the thermal head 15c. Therefore, the thermosensitive adhesive label did not get wound around the thermal head 15c.

EXAMPLE 10

The thermosensitive adhesive label No. 1 prepared in Example 1 was subjected to thermal printing of the thermosensitive coloring layer and heat-activation of the thermosensitive adhesive layer using a label printer equipped with a heat activator 10e as shown in FIG. 9.

To be more specific, the label printer as shown in FIG. 1 was modified in such a manner that the heat-application portion 14 of the thermal head 15 for use in the heat-activator 10 was covered with a release layer 18 having a thickness of 2 μm by coating a Teflon layer on the heat-application portion 14.

As a result, the heat-activated thermosensitive adhesive layer was prevented from sticking to the surface of the heat-application portion of the thermal head. Therefore, the thermosensitive adhesive label did not get wound around the thermal head.

EXAMPLE 11

Figure 10:
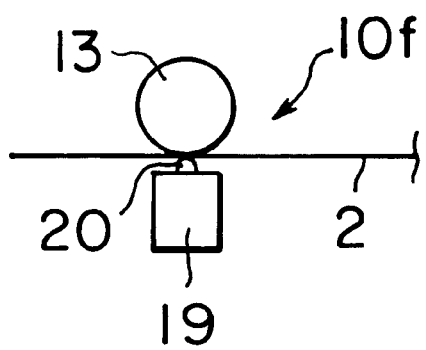

The thermosensitive adhesive label No. 1 prepared in Example 1 was subjected to thermal printing of the thermosensitive coloring layer and heat-activation of the thermosensitive adhesive layer using a label printer equipped with a heat activator 10f as shown in FIG. 10.

To be more specific, the label printer as shown in FIG. 1 was modified in such a manner that a thermal head 15 for use in the heat activator 10 in FIG. 1 was replaced by a thin-film heater 19 as shown in FIG. 10.

The thin-film heater 19 as shown in FIG. 10 was prepared by arranging a 1-mm-wide stripe of a heating resistor on a ceramic substrate. This heating resistor was covered with a protective glass layer (not shown), thereby constituting a heat-application portion 20.

In this case, the contact width of the thermosensitive adhesive layer of the adhesive label 2 with the heat-application portion 20 of the thin-film heater 19 was as large as 1 mm, so that the heat-activating operation became more efficient.

COMPARATIVE EXAMPLE 1

The thermosensitive adhesive label No. 1 prepared in Example 1 was subjected to thermal printing of the thermosensitive coloring layer and heat-activation of the thermosensitive adhesive layer using a label printer as shown in FIG. 1. In this case, however, the heat activator 10 of the label printer as shown in FIG. 1 was modified in such a manner that the thermal head 15 was replaced by a dryer capable of blowing hot air toward the thermosensitive adhesive layer side of the thermosensitive adhesive label.

The thermosensitive adhesive layer was heat-activated when exposed to hot air of 130° C. for 2 seconds.

COMPARATIVE EXAMPLE 2

The thermosensitive adhesive label No. 1 prepared in Example 1 was subjected to thermal printing of the thermosensitive coloring layer and heat-activation of the thermosensitive adhesive layer using a label printer as shown in FIG. 1. In this case, however, the heat activator 10 of the label printer as shown in FIG. 1 was modified in such a manner that the thermal head 15 was replaced by a heat-application roller.

The thermosensitive adhesive layer of the thermosensitive adhesive label was heat-activated when the label was transported at a speed of 4 inch/sec, with coming into contact with the heat-application roller of 130° C.

The following evaluations were conducted.

(1) Thermal energy for initiating color development of thermosensitive coloring layer Using the thermosensitive adhesive labels No. 1, No. 2, No. 3 and No. 4, respectively prepared in Examples 1, 2, 3 and 4, the thermal energy required to initiate the color development of the thermosensitive coloring layer was obtained by the following method:

Each thermosensitive adhesive label was loaded in a thermosensitive printing test apparatus equipped with a commercially available thin-film thermal print-head (made by Matsushita Electronic Components Co., Ltd.), and images were thermally printed on the thermosensitive coloring layer under the conditions that the applied electric power was 0.45 W/dot, the printing time for one line was 5 msec/line and the scanning density was 8×7.7 dot/mm, with the pulse width being changed in the range of 0.2 to 1.2 msec.

The coloring density of the image recorded on the thermosensitive coloring layer was measured using a McBeth densitometer RD-914. The applied thermal energy by which the above-mentioned coloring density of the image reached 1.0 was regarded as a thermal energy for initiating the color development of the thermosensitive coloring layer.

The thermal energy for initiating the color development of the thermosensitive coloring layer was obtained from the following formula:

$$\begin{bmatrix} \text{Thermal Energy for} \\ \text{Initiating Color} \\ \text{Development} \\ \text{(mJ/dot)} \end{bmatrix} = 0.45 \ (\text{W/dot}) \times \begin{bmatrix} \text{Pulse width (msec)} \\ \text{at the coloring} \\ \text{density of 1.0} \end{bmatrix}$$

The results are shown in Table 1.

(1) Thermal energy for initiating heat-activation of thermosensitive adhesive layer The thermosensitive adhesive layer of each thermosensitive adhesive label was heated using the same thermosensitive printing test apparatus under the same conditions as mentioned above.

The applied thermal energy by which the above-mentioned thermosensitive adhesive layer started to become adhesive was regarded as a thermal energy for initiating the heat-activation of the thermosensitive adhesive layer.

Corresponding to the heat-activation method employed in Example 5, the thermosensitive adhesive label was urged toward the thermal head using a pressure-application belt instead of the platen roll.

Corresponding to the heat-activation methods employed in Examples 6 to 10, the thin-film thermal head set in the above-mentioned thermosensitive printing test apparatus was respectively changed to the thick-film thermal head, the near-edge type thermal head, the edge-type thermal head, the corner-edge type thermal head, and the thermal head covered with a release layer.

Corresponding to the heat-activation method employed in Example 11, the thermosensitive adhesive layer was heat-activated in contact with the thin-film heater.

Corresponding to the heat-activation methods employed in Comparative Examples 1 and 2, the thermosensitive adhesive layer was heat-activated by use of a dryer and a heat-application roller respectively.

(3) Deposition of heat-activated thermosensitive adhesive on heater

The deposition of the heat-activated thermosensitive adhesive on the surface portion of the heater was visually inspected after each thermosensitive adhesive label was subjected to heat activation.

Then, the deposition of the heat-activated thermosensitive adhesive on the heater was evaluated on the following scale:

5: No adhesive was observed on any part of the heater by visual inspection.

4: A slight amount of adhesive was deposited on other portions than the heat-application portion of the heater.

3: A slight amount of adhesive was deposited on the heat-application portion of the heater.

2: The thermosensitive adhesive deposited on the heat-application portion of the heater was very noticeable.

The results are shown in Table 1.

(4) Background density of thermosensitive coloring layer in the course of heat activation of thermosensitive adhesive layer The background density of the thermosensitive coloring layer was measured using a McBeth densitometer RD-914 when the thermosensitive adhesive layer was heat-activated by each heat activation method.

The results are shown in Table 1.

TABLE 1

|  | Thermo-sensitive Adhesive Label | Heater | Thermal Energy for Initiating Color Development | Termal Energy for Initiating Heat-activation | Deposition of Adhesive on Heater | Background Density of Thermosensitive Coloring Layer |
|---|---|---|---|---|---|---|
| Ex. 1 | No. 1 | Thin-film thermal head | 0.29 mJ/dot | 0.33 mJ/dot | 4 | 0.08 |
| Ex. 2 | No. 2 | Thin-film thermal head | 0.32 mJ/dot | 0.33 mJ/dot | 4 | 0.08 |
| Ex. 3 | No. 3 | Thin-film thermal head | 0.36 mJ/dot | 0.33 mJ/dot | 4 | 0.08 |
| Ex. 4 | No. 4 | Thin-film thermal head | 0.32 mJ/dot | 0.33 mJ/dot | 4 | 0.08 |
| Ex. 5 | No. 1 | Thin-film thermal head | 0.29 mJ/dot | 0.35 mJ/dot | 4 | 0.08 |
| Ex. 6 | No. 1 | Thick-film thermal head | 0.29 mJ/dot | 0.34 mJ/dot | 3 | 0.08 |
| Ex. 7 | No. 1 | Near-edge type thin-film thermal head | 0.29 mJ/dot | 0.31 mJ/dot | 5 | 0.06 |
| Ex. 8 | No. 1 | Edge-type thin-film thermal head | 0.29 mJ/dot | 0.29 mJ/dot | 5 | 0.08 |
| Ex. 9 | No. 1 | Corner-edge type thin-film thermal head | 0.29 mJ/dot | 0.30 mJ/dot | 5 | 0.08 |
| Ex. 10 | No. 1 | Thin-film thermal head with release layer | 0.29 mJ/dot | 0.35 mJ/dot | 5 | 0.08 |
| Ex. 11 | No. 1 | Thin-film heater | 0.29 mJ/dot | (Note 1) | 4 | 0.08 |
| Comp. Ex. 1 | No. 1 | Dryer (hot air of 130° C.) | 0.29 mJ/dot | 130° C. × 2 sec | — | 0.16 |
| Comp. Ex. 2 | No. 1 | Heat-application roller (130° C.) | 0.29 mJ/dot | 130° C. × 4 inch/sec | 2 | 0.11 |

(Note 1): When the voltage was applied to the heat-application portion of the thin-film heater so that the surface temperature of the heater reached 130° C., and the transporting speed of the thermosensitive adhesive label was set to 4 inch/sec, the heat-activation of the thermosensitive adhesive layer was initiated.

As previously explained, the thermosensitive adhesive layer of the thermosensitive adhesive label is heated so as to make the thermosensitive adhesive layer adhesive by energizing a heater which is in contact with the thermosensitive adhesive layer. The heat-application portion of the heater comprises a ceramic substrate, and a resistor and a protective layer successively overlaid on the ceramic substrate. Therefore, the heat activation of the thermosensitive adhesive layer can be surely carried out by energizing the above-mentioned heat-application portion of the heater by the on-demand system. Since the thermal energy generated by the heat-application portion of the heater can be efficiently transmitted to the thermosensitive adhesive layer and the heat activation can be carried out, for example, by controlling the heating conditions of the heater in accordance with the pulse width, the thermal energy used for the heat activation can be minimized. In addition, since it is not necessary to preheat the heat-application portion of the heater, the thermosensitive adhesive label can be prevented from being overheated in the course of the heat activation, thereby improving the safety of the apparatus for heat-activating the thermosensitive adhesive label.

Furthermore, it is possible to sufficiently heat-activate the thermosensitive adhesive layer even though the thermosensitive adhesive label is transported at high speed because the thermal energy applied by the heat-application portion can be efficiently transmitted to the thermosensitive adhesive layer. As a result, the heat-activated thermosensitive adhesive can be prevented from transferring to the heat-application portion of the heater during the heat activation process. Such improvement of the efficiency in the heat-activating operation can increase the efficiency of the operation for attaching the thermosensitive adhesive label to a label-receiving member.

In the case where the thermosensitive coloring layer is provided on the support, opposite to the thermosensitive adhesive layer side with respect to the support, the color development of the thermosensitive coloring layer can be prevented in the course of the heat activation of the thermosensitive adhesive layer because the heating time for the heat activation process is very short.

Japanese Patent Application No. 08-275977 filed Oct. 18, 1996 and Japanese Patent Application No. 09-189848 filed Jul. 15, 1997 are hereby incorporated by reference.

What is claimed is:

1. A heat activation method for activating a thermosensitive adhesive label comprising a support and a thermosensitive adhesive layer which is provided on said support and is not adhesive at room temperature, so as to make said thermosensitive adhesive layer adhesive with the application of heat thereto, comprising the step of:

heating said thermosensitive adhesive layer so as to make said thermosensitive adhesive layer adhesive by energizing a heater which is in contact with said thermosensitive adhesive layer, said heater comprising a heat-application portion which comprises a ceramic substrate, and a resistor and a protective layer which are successively overlaid on said ceramic substrate.

2. The heat activation method as claimed in claim 1, wherein said heater comprises a thermal head.

3. The heat activation method as claimed in claim 1, wherein said heater comprises a thin-film heater.

4. The heat activation method as claimed in claim 1, wherein said thermosensitive adhesive label further comprises a thermosensitive coloring layer which is provided on said support, opposite to said thermosensitive adhesive layer with respect to said support.

5. The heat activation method as claimed in claim 4, wherein said thermosensitive adhesive label further comprises a heat insulating layer which is provided between said support and said thermosensitive coloring layer.

6. The heat activation method as claimed in claim 4, wherein said thermosensitive adhesive label further comprises a heat insulating layer which is provided between said support and said thermosensitive adhesive layer.

7. The heat activation method as claimed in claim 5, wherein said thermosensitive adhesive label further comprises a heat insulating layer which is provided between said support and said thermosensitive adhesive layer.

8. The heat activation method as claimed in claim 5, wherein said heat insulating lay er comprises non-expandable minute void particles with a voidage of 30% or more, each particle comprising a thermoplastic resin for forming a shell.

9. An apparatus for heat-activating a thermosensitive adhesive label comprising a support and a thermosensitive adhesive layer which is provided on said support and is not adhesive at room temperature, so as to make said thermosensitive adhesive layer adhesive with the application of heat thereto, comprising:

a heat activator for heating said thermosensitive adhesive layer of said thermosensitive adhesive label in contact with said thermosensitive adhesive layer so as to make said thermosensitive adhesive layer adhesive, said heat activator comprising a heat-application portion which comprises a ceramic substrate, and a resistor and a protective layer which are successively overlaid on said ceramic substrate, wherein said heat-application portion further comprises a release layer which is provided on said protective layer.

10. A label printer which comprises:

a label holder for holding a thermosensitive adhesive label comprising a support, a thermosensitive adhesive layer which is provided on one side of said support and is not adhesive at room temperature, and a thermosensitive coloring layer provided on the other side of said support, opposite to said thermosensitive adhesive layer with respect to said support;

a printing apparatus for printing an image on said thermosensitive coloring layer of said thermosensitive adhesive label;

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

11. The label printer as claimed in claim 10, wherein said heat activator comprises a thermal head.

12. The label printer as claimed in claim 11, wherein said thermal head is an edge-type thermal head.

13. The label printer as claimed in claim 10, wherein said heat activator comprises a thin-film heater.

14. A label printer which comprises:

a label holder for holding a thermosensitive adhesive printing label comprising a support, a thermosensitive adhesive layer which is provided on one side of said support and is not adhesive at room temperature, and a colored printing layer provided on the other side of said support, opposite to said thermosensitive adhesive layer with respect to said support;

a printing apparatus for printing an image on said colored printing layer of said thermosensitive adhesive label;

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

15. A label printer which comprises:

a label holder for holding a thermosensitive adhesive image-receiving label comprising a support, a thermosensitive adhesive layer which is provided on one side of said support and is not adhesive at room temperature, and an image-receiving surface provided on the other side of said support, opposite to said thermosensitive adhesive layer with respect to said support;

a printing apparatus for printing an image by thermal image transfer ink ribbon on said image-receiving surface of said thermosensitive adhesive label;

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

16. The label printer as claimed in claim 15, wherein said printing apparatus is a printing apparatus for printing an image by sublimation type thermal image transfer ink ribbon on said image-receiving surface.

17. A label printer which comprises:

a label holder for holding a thermosensitive adhesive image-receiving label comprising a support, a thermosensitive adhesive layer which is provided on one side of said support and is not adhesive at room temperature, and an image-receiving surface provided on the other side of said support, opposite to said thermosensitive adhesive layer with respect to said support;

a printing apparatus for printing an image by ink-jet image printing on said image-receiving surface of said thermosensitive adhesive label;

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

18. A label printer which comprises:

a label holder for holding a thermosensitive adhesive label comprising a support, a thermosensitive adhesive layer which is provided on one side of said support and is not adhesive at room temperature, and a surface for electrostatic recording provided on the other side of said support, opposite to said thermosensitive adhesive layer with respect to said support;

a printing apparatus for printing an image by electrostatic recording on said surface of said thermosensitive adhesive label;

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

19. An apparatus for heat-activating a thermosensitive adhesive label which comprises a support, a thermosensitive adhesive layer which is provided on one side of said support and is not adhesive at room temperature, and an image-bearing surface provided on the other side of said support, opposite to said thermosensitive adhesive layer with respect to said support, said apparatus comprising:

a cutter for cutting said thermosensitive adhesive label to a predetermined length; and a heat activator for heat-activating said thermosensitive adhesive layer of said thermosensitive adhesive label so as to make said thermosensitive adhesive layer adhesive in contact with said thermosensitive adhesive layer, said heat activator comprising a heat-application portion which comprises a ceramic substrate, and a resistor and a protective layer which are successively overlaid on said ceramic substrate.

* * * * *